(12) United States Patent
Himeno (10) Patent No.: US 12,475,196 B2
(45) Date of Patent: Nov. 18, 2025

(54) CLASSIFICATION SYSTEM

(71) Applicant: IRYOU JYOUHOU GIJYUTU KENKYUSHO CORPORATION, Fukuoka (JP)

(72) Inventor: Shinkichi Himeno, Fukuoka (JP)

(73) Assignee: IRYOU JYOUHOU GIJYUTU KENKYUSHO CORPORATION, Fukuoka (JP)

(*) Notice: Subject to any disclaimer, the term of this patent is extended or adjusted under 35 U.S.C. 154(b) by 594 days.

(21) Appl. No.: 18/065,730

(22) Filed: Dec. 14, 2022

(65) Prior Publication Data

US 2023/0112990 A1    Apr. 13, 2023

Related U.S. Application Data (63) Continuation-in-part of application No. PCT/JP2021/029850, filed on Aug. 15, 2021.

(30) Foreign Application Priority Data

Aug. 20, 2020  (JP) ................................. 2020-139021

(51) Int. Cl.
  *G06F 18/24* (2023.01)
  *G06F 18/22* (2023.01)
  (Continued)

(52) U.S. Cl.
  CPC ............ *G06F 18/241* (2023.01); *G06F 18/22* (2023.01); *G06F 18/2431* (2023.01)

(58) Field of Classification Search
  None
  See application file for complete search history.

(56) References Cited

U.S. PATENT DOCUMENTS 11,625,561 B2 *  4/2023  Kuwajima .......... G06F 18/2431
                                                       382/159
12,339,932 B2 *  6/2025  Himeno .................. G06F 16/55
(Continued)

FOREIGN PATENT DOCUMENTS

JP          201377127 A      4/2013
JP         2018175226 A     11/2018
(Continued)

OTHER PUBLICATIONS

Search Report issued on Mar. 5, 2024, in corresponding European Application No. 21858260.9, 10 pages.
(Continued)

*Primary Examiner* — Maikhanh Nguyen
(74) *Attorney, Agent, or Firm* — Maier & Maier, PLLC (57) ABSTRACT

A classification system includes classification training data-specific classification data correct attribute setting configured to set not only the correct classes of pieces of classification training data but also the correct attributes of the pieces of classification training data and classification/attribute training configured to train classification by comparing the class/attribute estimation result outputs with the correct classes set by correct class setting and comparing the attribute estimation result outputs with the correct attributes set by the classification training data-specific classification training data correct attribute setting. Pieces of classification target data from classification target data acquisition are newly inputted to the trained classification means. Classification/attribute result output outputs both the classification results and attribute results of the pieces of classification target data so that validity of the classification results can be considered.

3 Claims, 8 Drawing Sheets

(51) Int. Cl.
  *G06F 18/241*   (2023.01)
  *G06F 18/2431*  (2023.01)

(56) References Cited

U.S. PATENT DOCUMENTS

| | | | |
|---|---|---|---|
| 12,343,188 B2* | 7/2025 | Kobayashi | G06T 3/4007 |
| 2010/0040285 A1* | 2/2010 | Csurka | G06V 10/464 |
| | | | 382/170 |
| 2010/0211125 A1* | 8/2010 | Johnson | A61B 5/6846 |
| | | | 607/4 |
| 2012/0023050 A1* | 1/2012 | Georgopoulos | G16H 50/70 |
| | | | 706/20 |
| 2018/0293465 A1* | 10/2018 | Kanada | G06T 7/0012 |
| 2019/0026630 A1 | 1/2019 | Ide et al. | |
| 2019/0188845 A1 | 6/2019 | Tamai | |
| 2019/0332898 A1 | 10/2019 | Saruta | |
| 2020/0257925 A1 | 8/2020 | Kuwajima et al. | |
| 2020/0311616 A1* | 10/2020 | Rajkumar | G06N 3/08 |
| 2021/0397905 A1 | 12/2021 | Himeno | |

FOREIGN PATENT DOCUMENTS

| | | |
|---|---|---|
| JP | 20193396 A | 1/2019 |
| JP | 201982883 A | 5/2019 |
| JP | 2019106090 A | 6/2019 |
| JP | 2019192009 A | 10/2019 |
| WO | 2017168865 A1 | 10/2017 |
| WO | 2020179764 A1 | 9/2020 |

OTHER PUBLICATIONS

Ul Hassan et al., "Explaining Visual Classification Using Attributes", European Union, Sep. 4, 2019, 6 pages.
Xu et al., "Where Is The Model Looking At?—Concentrate and Explain the Network Attention", IEEE Journal of Selected Topics in Signal Processing, Mar. 2020, vol. 14, No. 3, 11 pages.
International Search Report issued on Oct. 19, 2021, in corresponding International Application No. PCT/JP2021/029850, 5 pages.
Office Action issued on Jan. 4, 2021, in corresponding Japanese Application No. 2020-139021, 12 pages.

* cited by examiner

FIG. 1A  CONVENTIONAL CLASSIFICATION SYSTEM

ATTRIBUTE LIST-BASED CORRECT CLASS ESTIMATION MEANS

CLASSIFICATION RESULT OUTPUT MEANS

| CLASS ESTIMATION RESULT | RHEUMATOID ARTHRITIS |
|---|---|
| INFLAMMATION | 1 |
| INFECTION | 0 |
| IMMUNITY | 1 |
| RESPIRATORY ORGANS | 0 |
| DIGESTIVE ORGANS | 0 |
| ... | ... |

CLASS-SPECIFIC ATTRIBUTE LIST MANAGEMENT MEANS

| | APPENDICITIS | PNEUMONIA | RHEUMATOID ARTHRITIS |
|---|---|---|---|
| INFLAMMATION | 1 | 1 | 1 |
| INFECTION | 1 | 1 | 0 |
| IMMUNITY | 1 | 0 | 1 |
| RESPIRATORY ORGANS | 0 | 1 | 0 |
| DIGESTIVE ORGANS | 1 | 0 | 0 |
| ... | ... | ... | ... |

CLASS ATTRIBUTE LIST

PRESENCE OF BONE EROSION ON XP

RESPONSE

ATTRIBUTE INQUIRY MEANS

CLASSIFICATION TARGET DATA MANAGEMENT MEANS

FIG.5

CLASSIFICATION SYSTEM

TECHNICAL FIELD

The present invention relates to a classification system that determines which class an obtained image or observation data belongs to using a great amount of imagery, observation data, or the like (so-called "big data").

BACKGROUND

The development and widespread use of the Internet and the development of the technology called "cloud" that stores and parallel computes large-capacity data have enabled processing of a great amount of data, which was previously impossible. Classification systems that form a classifier by processing (training) a large number of combinations of images, observation data, or the like and the correct classes thereof (training data) and estimate the class that a newly obtained image or observation data belongs to have been rapidly developed, particularly, in the wake of the advent of the technique called deep learning.

In the field of image recognition, technologies that identify a person or read the emotion of the person, such as anger or sadness, from an image of the person's face have evolved. In the field of object recognition, technologies that estimate the type of an object on an image have evolved. In the field of medicine, technologies that identify the presence of a cancer or the like from a medical image, such as X-ray, CT, or microscopic image, have been actively studied.

Similarly, technologies that perform deep learning using a great amount of financial data or economic data and determine the credibility of corporations or predict rises and falls in the stock price have been actively studied. Also in the field of medicine, technologies that predict the disease name of a patient having a certain symptom or finding or estimate an effective treatment using a great amount of data on the symptoms or laboratory findings of many patients have been studied.

Background art literature relating to the present application includes the following.

CITATION LIST

Patent Literature 1: Japanese Unexamined Patent Application Publication No. 2018-175226
Patent Literature 2: Japanese Unexamined Patent Application Publication No, 2019-3396

SUMMARY

Deep learning and the like use a neural network consisting of many layers. Even if a recognition result is obtained, it is difficult for a human to understand why such a recognition result has been obtained.

Although the recognition accuracy has been increased, it is not 100%. Accordingly, misrecognition inevitably occurs and the user has to be responsible for the misrecognition.

At this time, the user has to be able to explain to third parties why such recognition has been reached. Otherwise, the user would suffer a risk, such as compensation for damage. Thus, there is a limit to the practical utility of deep learning and the like.

Also, there has been an illusion as if all problems were solved by analyzing big data.

In each field, a thinking framework having high utility has been created over a long period of time. If all data is flattened and analyzed without previously assuming any internal logic structure, already known ordinary knowledge is simply reconfirmed or an indefinable correlation is simply pointed out in not a few cases even if the amount of data is large.

The present invention has been made to solve the above problems with the background art, and an object thereof is to provide a classification system that learns not only training data about correct classes but also training data about the correct attributes of the classes and thus, when an image is presented, outputs not only the class of the image but also estimation of the attributes of the image and further estimates the ground for the class. Another object thereof is to provide a classification system that includes verification means (attribute list-based correct class estimation means) is able to verify the validity of classification by checking an obtained attribute list against a previously constructed class-specific attribute database (class-specific attribute list management means), to systematically explain the ground for the classification, and to estimate also a class that has not been given as training data at the time of training. Yet another object thereof is to provide a classification system that is able to estimate attributes using multiple trained classification means disposed in parallel and to estimate classes by checking the obtained attributes against class-specific attribute list storage means.

As means for accomplishing the objects, in a knowledge management system, a classification system includes classification training data management means configured to obtain pieces of classification training data, classification training data-specific correct class setting means configured to set correct classes with respect to the pieces of classification training data, classification means configured to receive the pieces of classification training data and to output classification results, and classification training means configured to train the classification means by comparing the classification results with the correct classes previously set by the classification training data-specific correct class setting means and feeding back an error. The classification training data-specific correct class setting means includes classification training data-specific classification data correct attribute setting means configured to set not only the correct classes of the pieces of classification training data but also correct attributes of the pieces of classification training data. The classification means includes input means configured to receive the pieces of classification training data and classification/attribute result output means configured to output not only the classification results but also class/attribute estimation results including attribute estimation results. The classification trainimg means includes classification/attribute training means configured to compare the class/attribute estimation results outputted from the classification means with the correct classes and the correct attributes set by the classification training data-specific correct class setting means and the classification training data-specific classification data correct attribute setting means and to, if both are not matched, make an adjustment so that the class/attribute estimation results come close to the correct classes and the correct attributes by feeding back an error to the classification means. Pieces of classification target data from classification target data acquisition means are newly inputted to the trained classification means. The classification/attribute result output means included in the trained classification means outputs both classification results and attribute estimation results of the pieces of classification target data so that validity of the classification results can be considered.

According to a classification system, the classification system includes class-specific attribute list management means configured to manage attribute lists corresponding to the classes and attribute list-based correct class estimation means configured to estimate more likely classes of the inputted pieces of classification target data by applying the pieces of classification target data to the trained classification means and checking obtained attribute lists against the attribute lists managed by the class-specific attribute list management means.

According to a classification system, in the classification system the attribute list-based correct class estimation means includes attribute inquiry means configured to, if the obtained attribute lists include an attribute that is not included in the attribute lists managed by the class-specific attribute list management means, make an inquiry to the classification target data management means about the attribute.

According to a classification system, in the classification system the trained classification means includes multiple trained classification means disposed in parallel, and the classification system includes attribute list-based multiple parallel classification means configured to estimate correct classes of the pieces of classification target data by checking, against the class-specific attribute list management means, attribute lists obtained by applying the pieces of classification target data to the multiple trained classification means disposed in parallel.

The classification system includes the classification training data-specific classification data correct attribute setting means and thus sets not only the correct classes of the pieces of classification training data but also the correct attributes of the pieces of classification training data.

The classification means includes the input means configured to receive pieces of classification training data and the classification/attribute result output means configured to output not only classification results but also class/attribute estimation results including attribute estimation results.

The classification training means includes the classification/attribute training means configured to compare the class/attribute estimation results outputted from the classification means with the correct classes and the correct attributes set by the classification training data-specific correct class setting means and the classification training data-specific classification data correct attribute setting means and to, if both are not matched, make an adjustment so that the class/attribute estimation results come close to the correct classes and the correct attributes by feeding back an error to the classification means. Pieces of classification target data from classification target data acquisition means are newly inputted to the trained classification means. The classification/attribute result output means included in the trained classification means outputs both classification results and attribute estimation results of the pieces of classification target data so that validity of the classification results can be considered.

The classification system includes the attribute list-based correct class estimation means and thus estimates more likely classes of the inputted pieces of classification target data by applying the pieces of classification target data to the trained classification means and checking obtained attribute lists against the attribute lists managed by the class-specific attribute list management means.

The classification system of includes the attribute inquiry means and thus, if the obtained attribute lists include an attribute that is not included in the attribute lists managed by the class-specific attribute list management means, makes an inquiry to the classification target data management means about the attribute.

The classification system of includes the attribute list-based multiple parallel classification means and thus estimates the correct classes of the pieces of classification target data by checking, against the class-specific attribute list management means, attribute lists obtained by applying the pieces of classification target data to the multiple trained classification means disposed in parallel.

DETAILED DESCRIPTION

The present application is a system that is run using a computer. This computer includes an input device (mouse, keyboard, etc.), an output device (monitor, printer, etc.), a storage device (memory, hard disk), an arithmetic unit (CPU), a control unit (CPU), and the like, as well as includes a program for performing the means (functions) of the present application.

The classification system includes the server apparatus, the database and the terminal. The server apparatus, the database and the terminal connected through network. The server apparatus is a prior computer. The server apparatus includes: an arithmetic apparatus including the processor, a main storage apparatus, an auxiliary storage apparatus, input apparatus, output apparatus, and communication apparatus. The arithmetic apparatus, the main storage apparatus, the auxiliary storage apparatus, input apparatus, output apparatus, the communication apparatus connected through a bus interface. The arithmetic apparatus includes the processor that can execute an instruction set. The main storage apparatus includes a volatile memory such as a random access memory (RAM). The auxiliary storage apparatus includes a recording medium such as a nonvolatile memory, and a recording method thereof is not limited. The recording medium indicates a hard disk drive (HDD) or a solid state drive (SSD), for example. The input apparatus is, for example, a keyboard device. The output apparatus includes, for example, display as a liquid crystal panel. The communication apparatus is a network interface that can connect to network. The processor of the server apparatus executes the function of the units of the classification system including: a classification training data management means, a classification training data-specific correct class setting means, a classification means, a classification training means, a classification training data-specific classification data correct attribute setting means, an input means, a classification/ attribute result output means, a classification/attribute training means, a class-specific attribute list management means, an attribute list-based correct class estimation means, an attribute inquiry means, an attribute list-based multiple parallel classification means or the like. The database is composed of the auxiliary storage apparatus of the server apparatus or the auxiliary storage apparatus independent from the server apparatus. The database stores information managed by the classification system. The terminal is a prior computer including a processor.

Figure 1A:
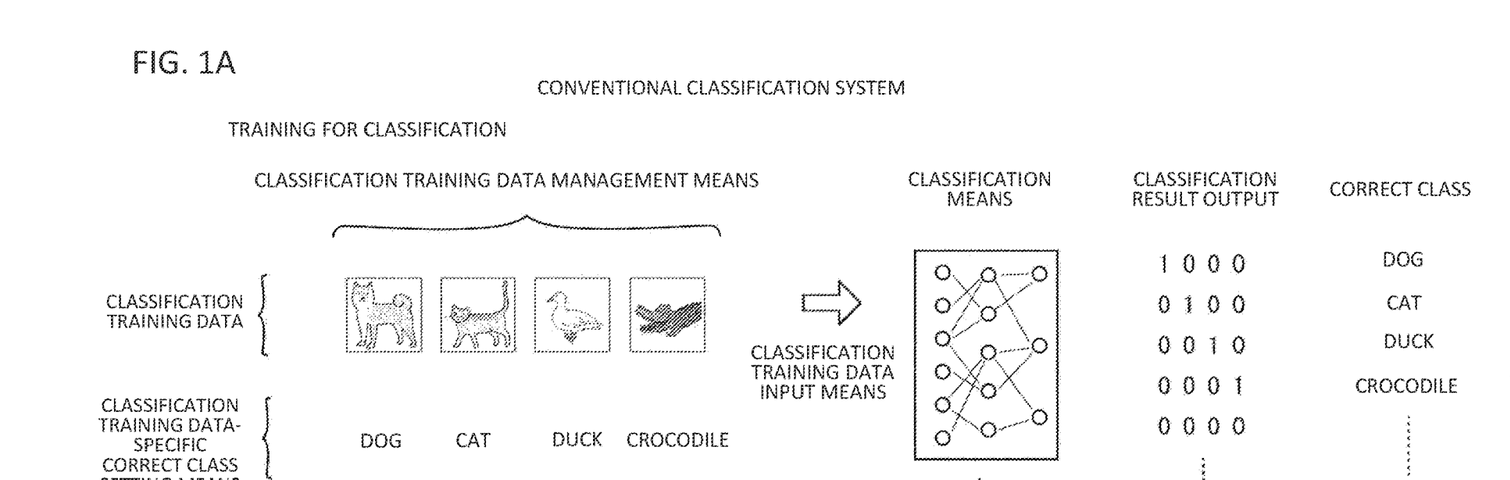
FIG. 1A is schematic drawings of a conventional classification system which shows training for classification.
Figure 1B:
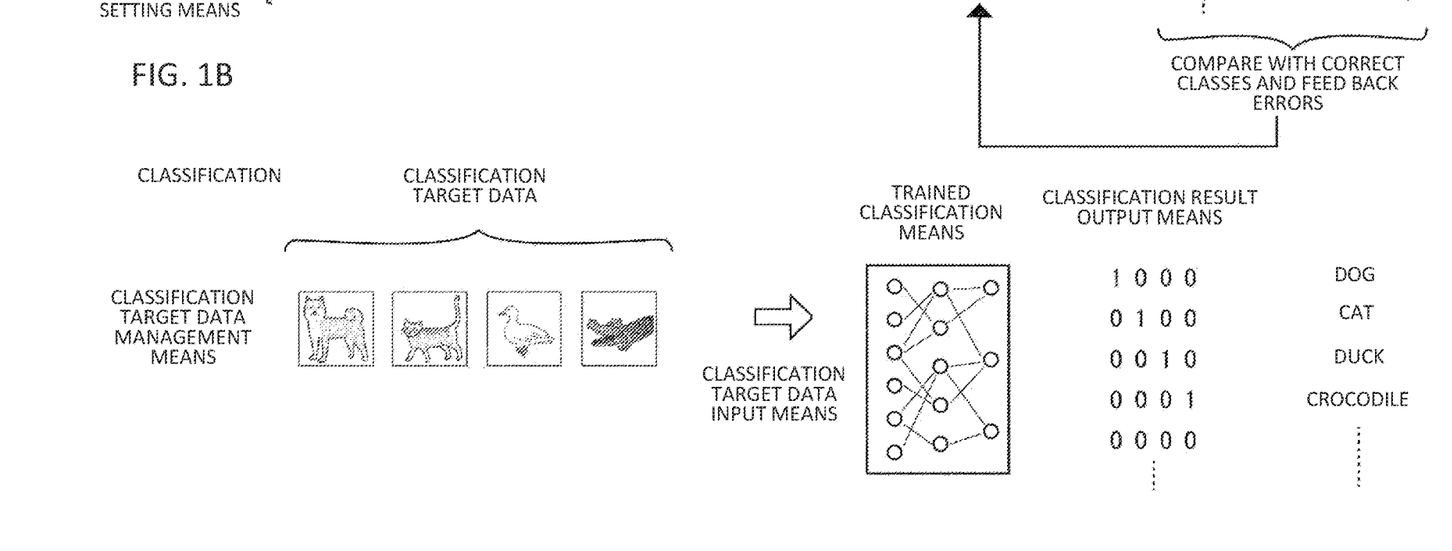
FIG. 1B is schematic drawings of a conventional classification system which shows classification.

FIGS. 1A and 1B are schematic drawings of a conventional classification system.

In FIGS. 1A and 1B, classification of images is taken as an example. First, referring to FIG. 1A, training for classification will be described.

Classification training material management means is managing, as pairs, images, which are classification training data, and the correct classes of the images set by classification training material-specific correct class setting means.

Classification data acquisition means acquires images, symptoms, findings, or the like, which are information to be classified, and provides them to classification means through classification training data input means. If the classification data is images, the images may be acquired using any method, for example, camera images may be directly inputted or an image file may be read.

For symptoms, findings, or the like, they ay be acquired using any method such as reading from electronic health records, any observation data file, or a time-series data file.

The images, which are classification training data, are inputted to the input layer of the classification means (classification training data input means).

In the classification means, many hidden layers including neural elements mimicking neurons are connected by weighted links as in deep learning, and the weighted links are calculated sequentially from the input layer.

The amount of stimulation to a neural element is summed up on the basis of the presence or absence of firing of links in the preceding stage of the neural element and the weights of the links. When a preset threshold is exceeded, the neural element fires and produces weighted outputs to the neural elements in the subsequent hidden layer.

The last layer of the classification means produces classification result outputs, and thing of the respective neural elements in this output layer corresponds to the respective classification result outputs.

The classification results are compared with the correct classes of the images set by classification training data-specific correct class setting means. If both are not matched, the errors are fed back to the classification means using a technique such as backpropagation and the weights of the links are adjusted so that the outputs come close to the correct classes. When the errors become equal to or smaller than a preset reference, the training of the classification means is completed (trained classification means).

When performing classification of FIG. 1B, images, which are classification target data managed by classification target data management means, are inputted to the trained classification means using classification target data input means. Firing of the respective neural elements in classification result output means corresponds to classification results.

Figure 2A:
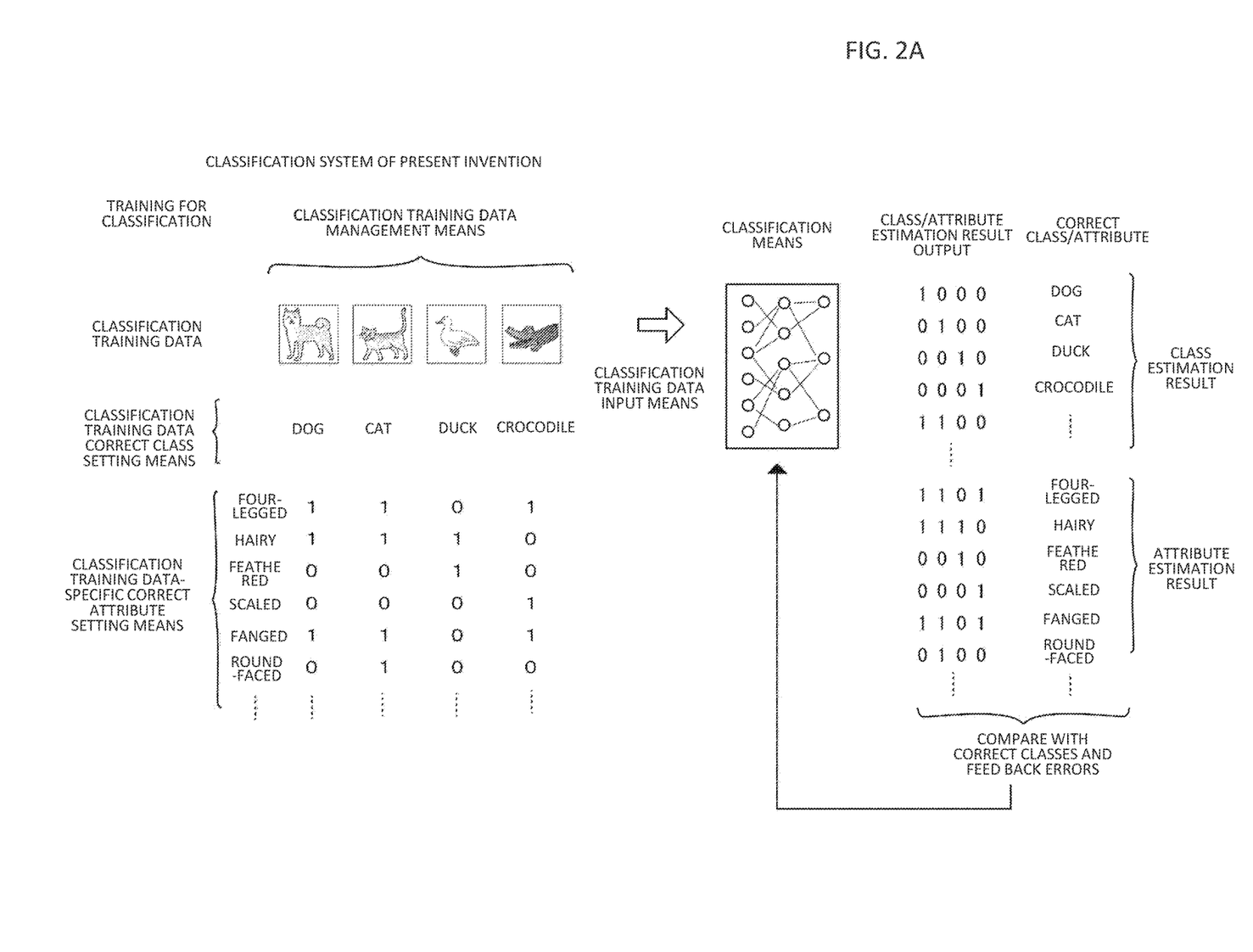
FIG. 2A is a schematic drawing showing a classification system according to the present invention during training for classification.
Figure 2B:
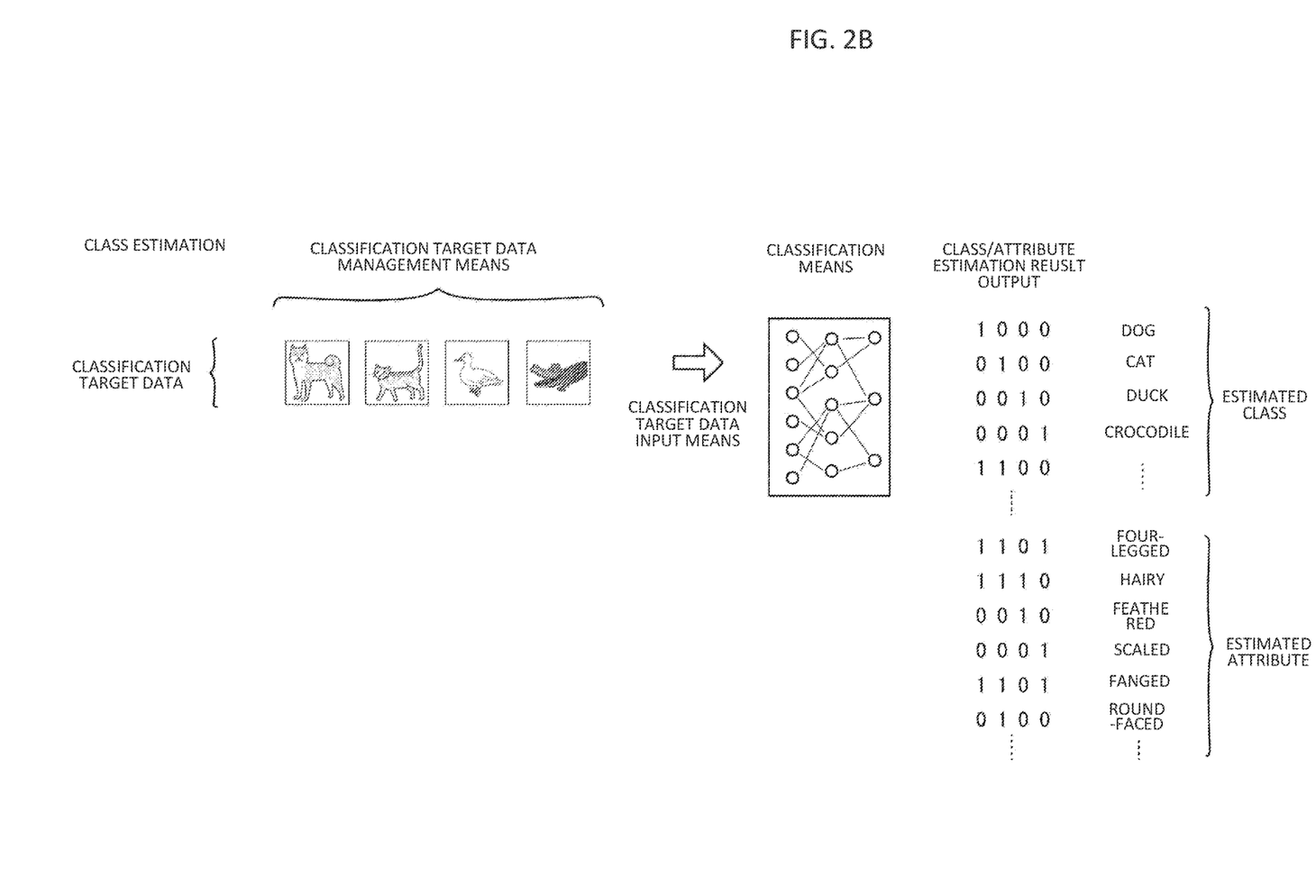
FIG. 2B is a schematic drawing showing the classification system according to the present invention during classification.

FIGS. 2A and 2B are schematic drawings of a classification system according to the present invention.

Classification of images are taken as an example as in FIG. 1.

FIG. 2A shows training for classification. Classification training data management means manages, as sets, images, which are classification training data, the correct classes of the images set by classification training data-specific correct class setting means, and the correct attributes set by classification training data-specific correct attribute setting means. The images, which are classification training data, are inputted to the input layer of classification means (classification training data input means).

In the classification means, as in deep learning, many hidden layers including neural elements mimicking neurons are connected using weighted links, and the weighted links are calculated sequentially from the input layer.

The amount of stimulation to a neural element is summed up on the basis of the presence or absence of firing of a link in the preceding stage of the neural element and the weight of the link. When a preset threshold is exceeded, the neural element fires and produces weighted outputs to the neural elements in the subsequent hidden layer. The last layer of the classification means produces class/attribute estimation result outputs, and firing of the respective neural elements in this output layer corresponds to the respective class/attribute estimation results.

The class/attribute estimation results are compared with the correct classes/attributes of the images set by classification training data-specific correct class setting means and classification training data-specific correct attribute setting means. If both are not matched, the errors are fed back to the classification means using a technique such as backpropagation and the weights of the links are adjusted so that the class/attribute estimation result outputs come close to the correct classes/attributes. When the errors become equal to or smaller than a preset reference, the training of the classification means is completed (trained classification means).

FIG. 2B shows classification.

When performing classification, images, which are classification target data managed by classification target data management means, are inputted to the trained classification means using classification target data input means.

The respective neural elements that have fired in classification/attribute result output means correspond to class/ attribute estimation results.

Since the conventional method shown in FIG. 1 only shows the class estimation results, the reason why the classification results have been obtained is unknown. On the other hand, the present invention estimates not only the classes of the images but also the attributes thereof and thus is able to present the ground for the classes.

Figure 3:
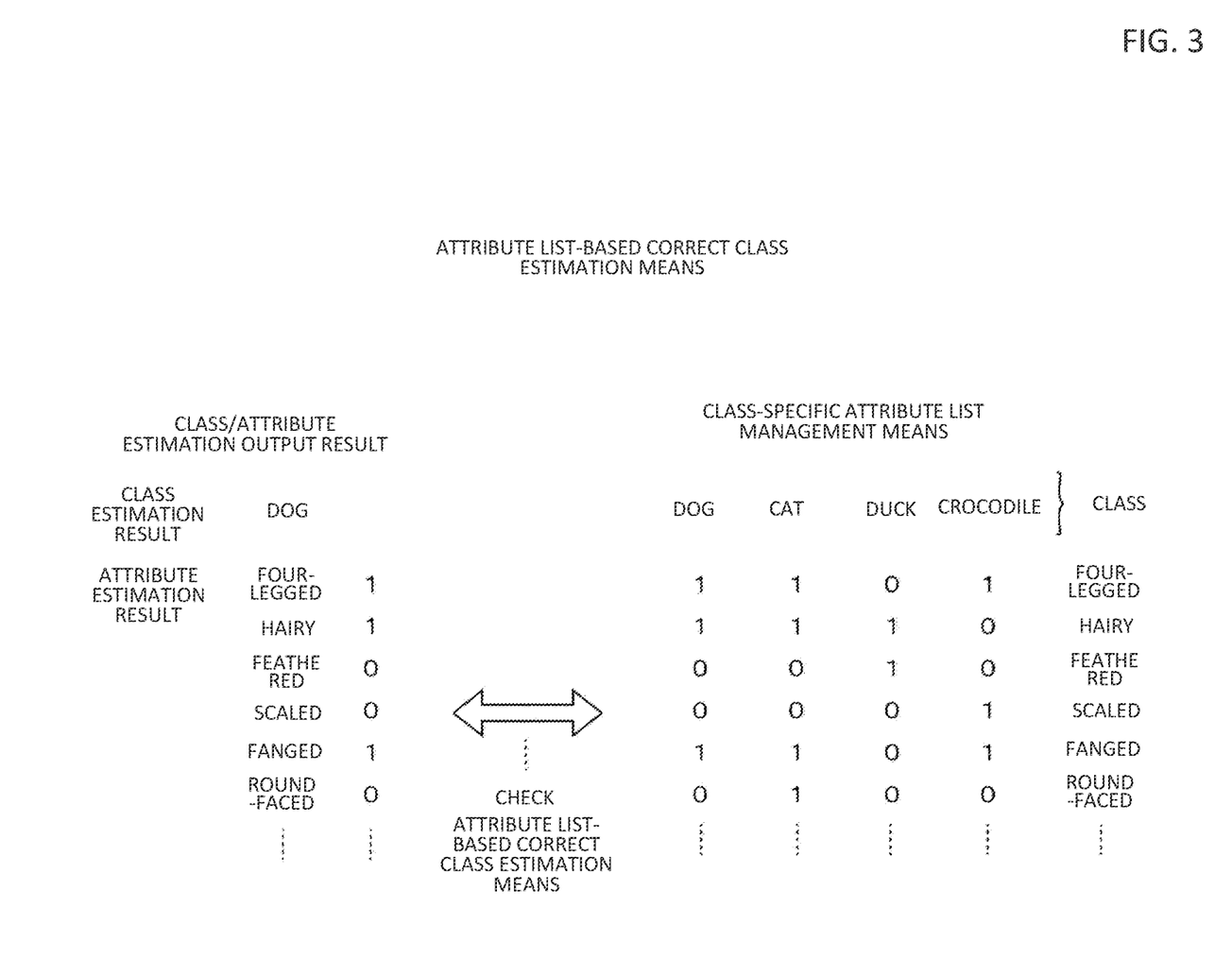
FIG. 3 is a drawing showing attribute list-based correct class estimation means that estimates a more likely class by checking an obtained attribute list against class-specific attribute list management means.

FIG. 3 is a drawing showing attribute list-based correct class estimation means that estimates a more likely class by checking an obtained attribute list against class-specific attribute list management means.

In FIGS. 2A and 2B, the ground for class estimation is given by estimating the classes and attributes simultaneously. However, any of the classes and the attributes are not 100 percent accurate, and errors or fluctuations in estimation inevitably occur.

To address this problem, class-specific attribute lists are previously managed (class-specific attribute list management means). When the class/attribute estimation output results of an image are obtained, the validity of the estimated classification results is considered by checking the class/attribute estimation output results against an attribute list managed by the class-specific attribute list management means.

If the degree of matching between the estimated attribute list and the attribute list related to the estimated class managed by the class-specific attribute list management means is low, a class having an attribute list having a higher degree of matching is estimated as the correct class (attribute list-based correct class estimation means).

Figure 4A:
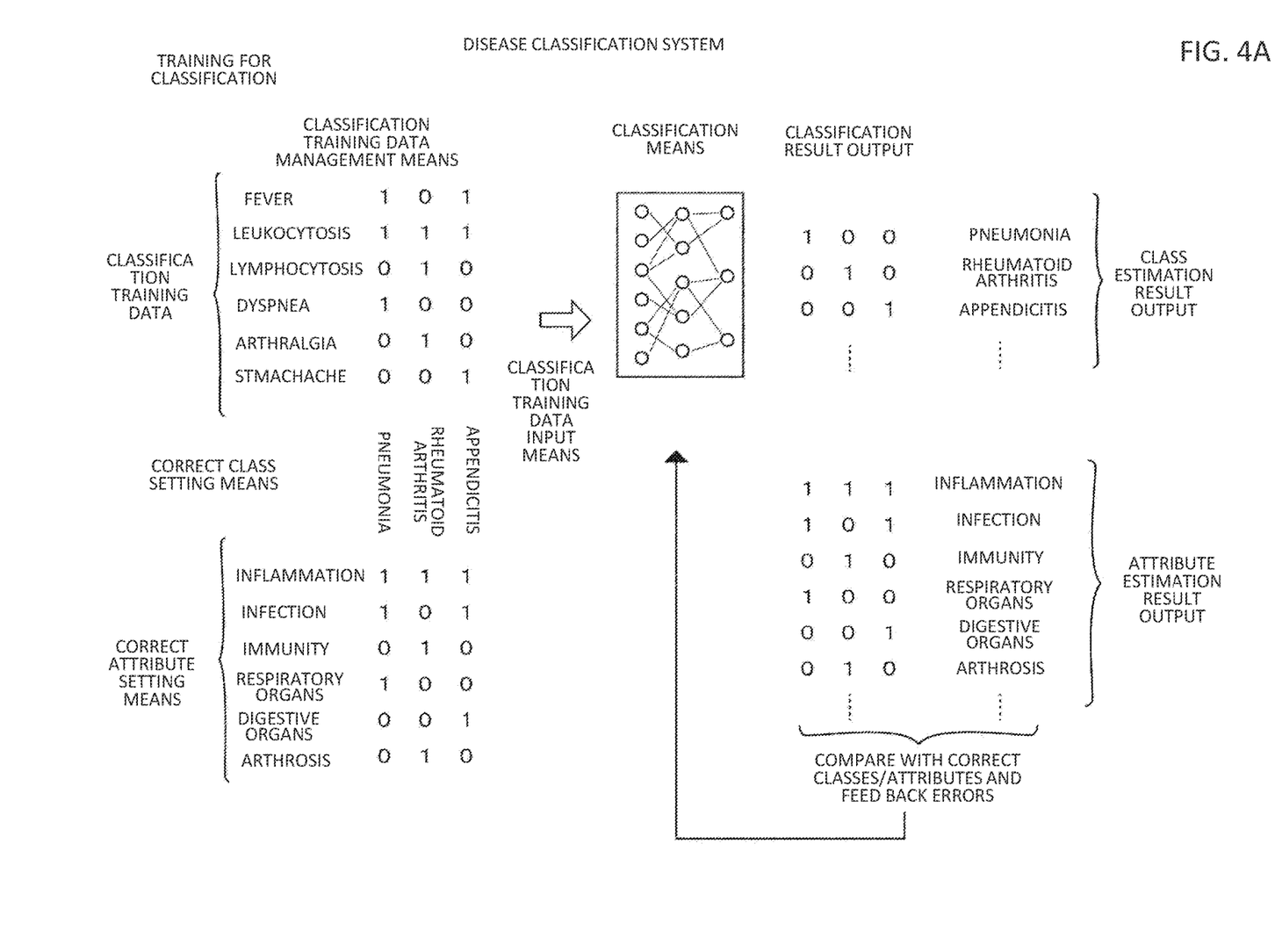
FIG. 4A is a drawing showing a disease classification system according to the present invention during training for classification.
Figure 4B:
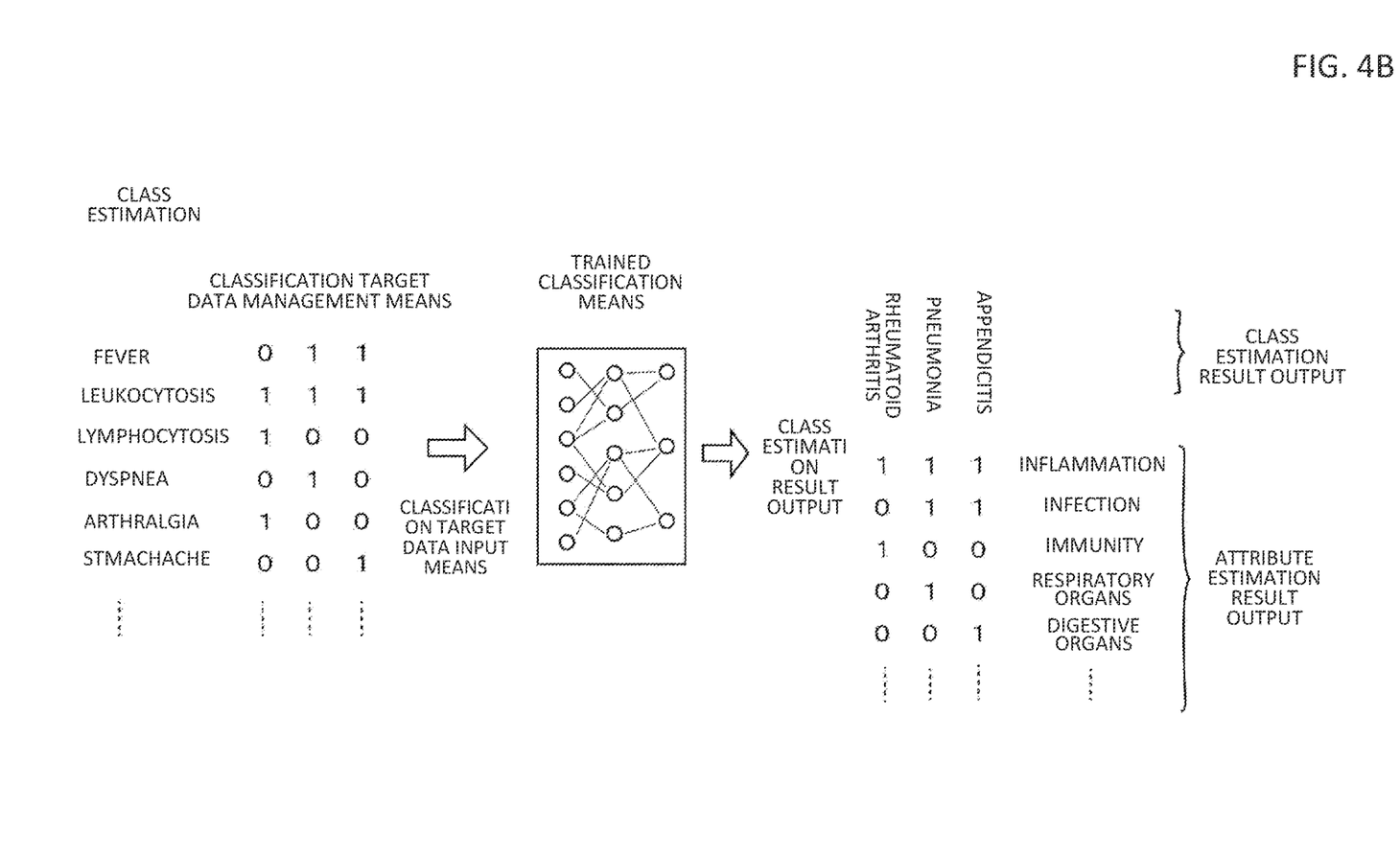
FIG. 4B is a drawing showing the disease classification system according to the present invention during classification.

FIGS. 4A and 4B are drawings showing a disease classification system acccording to the present invention.

FIG. 4A shows training for classification.

Classification training data management means manages, as sets, symptoms and/or findings, which are classification training data, correct classes having those symptoms and/or findings set by classification training data-specific correct class setting means (disease names), and correct attributes (inflammation, infection, and the like) set by classification data-specific correct attribute setting means.

The symptoms and/or findings, which are classification training data, are inputted to the input layer of classification means (classification training data input means).

In the classification means, as in deep learning, many hidden layers including neural elements mimicking neurons are connected by weighted links, and the weighted links are calculated sequentially from the input layer.

The amount of stimulation to a neural element is summed up on the basis of the presence or absence of firing of a link in the preceding stage of the neural element and the weight of the link. When a preset threshold is exceeded, the neural element fires and weighted outputs are made to the neural elements in the subsequent hidden layer.

The last layer of the classification means outputs the class/attribute results, and the firing of the respective neural elements in this output layer corresponds to the respective class/attribute estimation results.

The class/attribute results are compared with the correct classes/attributes of the symptoms and/or findings set by the classification training data-specific correct class setting means and classification data-specific correct attribute setting means. If both are not matched, the errors are fed back to the classification means using a technique such as backpropagation and the weights of the links are adjusted so that the result outputs come close to the correct classes/attributes. When the errors become equal to or smaller than a preset reference, the training of the classification means is completed (trained classification means).

FIG. 4B shows classification. When performing classification, symptoms and/or findings, which are classification target data managed by classification target data management means, are inputted to the trained classification means using classification target data input means.

The firing of the respective neural elements in classification/attribute result output means corresponds to the class/attribute estimation results.

The conventional method shown in FIG. 1 only shows the class estimation results and therefore the reason why the classification results have been obtained is unknown.

On the other hand, in the present invention, not only the classification results but also the attributes of the symptoms and/or findings are estimated. Thus, for example, the class name of this classification target is estimated as pneumonia since the classification target has inflammation and infection and has a legion in the respiratory organs. That is, the ground for the class is presented.

Figure 4C:
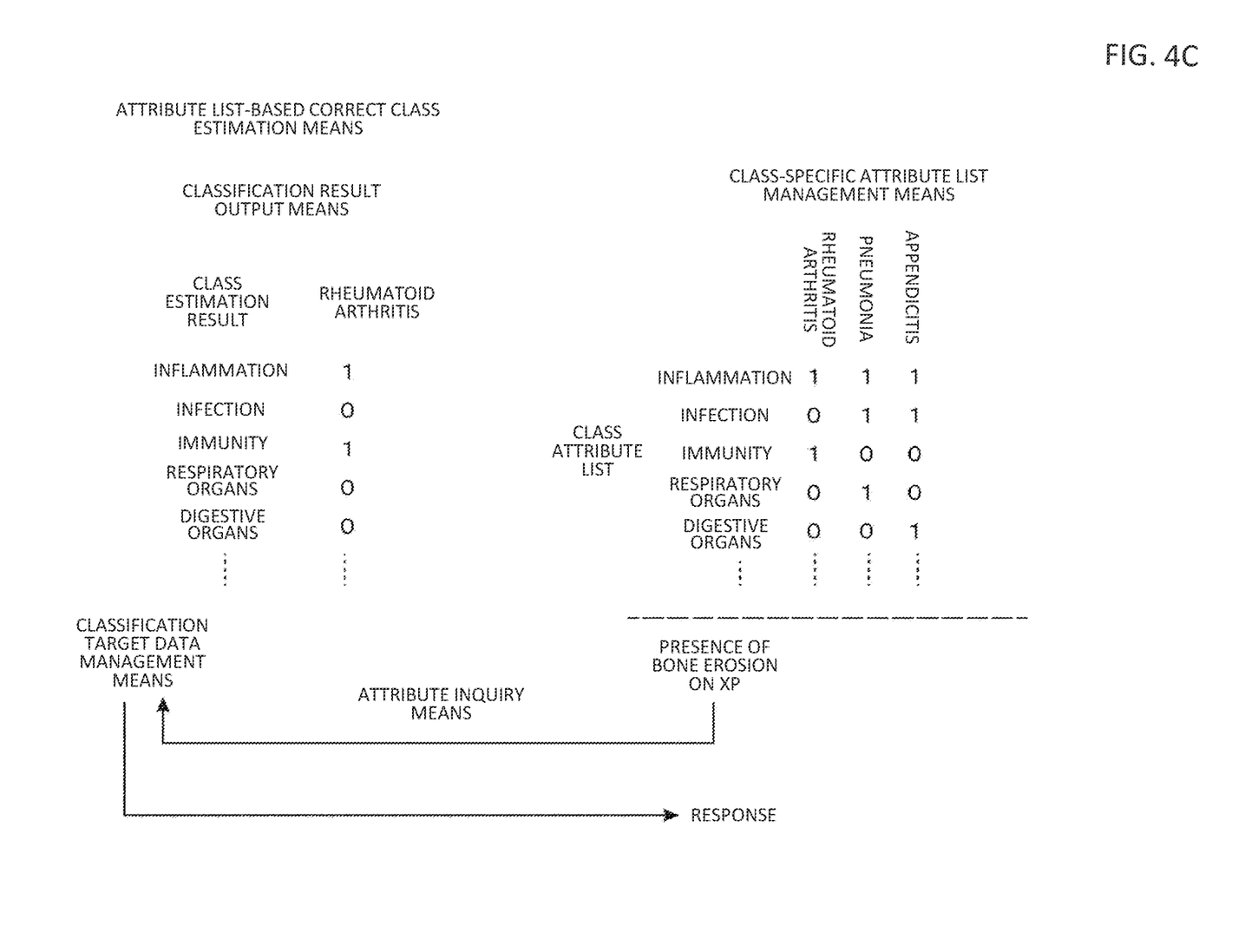
FIG. 4C is a drawing showing attribute list-based correct class estimation means that estimates a more likely class by checking an obtained attribute list against class-specific attribute list management means.

FIG. 4C is a drawing showing attribute list-based correct class estimation means that estimates a more likely class by checking an obtained attribute list against class-specific attribute list management means.

In FIG. 4B, the ground for the estimation of the classes (disease names) is given by estimating the classes (disease names) and attributes simultaneously. However, any of the classes and the attributes are not 100 percent accurate, and errors or fluctuations in estimation inevitably occur.

To address this problem, class (disease name)-specific attribute lists are previously managed (class-specific attribute list management means). When the class/attribute estimation output results of a symptom or finding is obtained, the results are checked against an attribute list managed by the class-specific attribute list management means and the validity of the estimated class estimation result is considered.

If the degree of matching between the estimated attribute list and the attribute list related to the estimated class managed by the class-specific attribute list management means is low, a class (disease name) having an attribute list having a higher degree of matching is estimated as the correct class (attribute list-based correct class estimation means).

Note that if a symptom and a finding have a correlation, the diagnostic name-specific symptom/finding distributions of disease names corresponding to both naturally resemble each other and therefore the amount of additional information is small. For this reason, those distributions have to be depreciated accordingly. In this case, it is useful to previously obtain the frequencies of occurrence of pairs of symptoms and/or findings of each diagnostic name.

Many attributes of individual classes overlap each other. By organizing common attributes of classes into the attributes of a higher class, as seen in a phylogenetic tree, the amount of description of the attributes is minimized, resulting in facilitation of search.

A child inherits the attributes of the class of its parent as attributes of its own class, as well as holds attributes specific to its own class. If the attributes inherited from the class of the parent are changed, that is, overwritten at the level of the class of the child, a grandchild inherits the changed attributes of the class of the child as attributes of its own class.

In this series of processes, not all symptoms or findings are previously prepared at most clinical sites.

In these cases, an inquiry is made to the classification target data management means (electronic health records, or the like) about symptoms and/or findings that are essential but absent (for example, the presence or absence of bone erosion on Xp in the case of rheumatoid arthritis in FIG. 4C) (attribute inquiry means), and the symptoms and/or findings are obtained in response. Thus, classification accuracy is improved.

Figure 5:
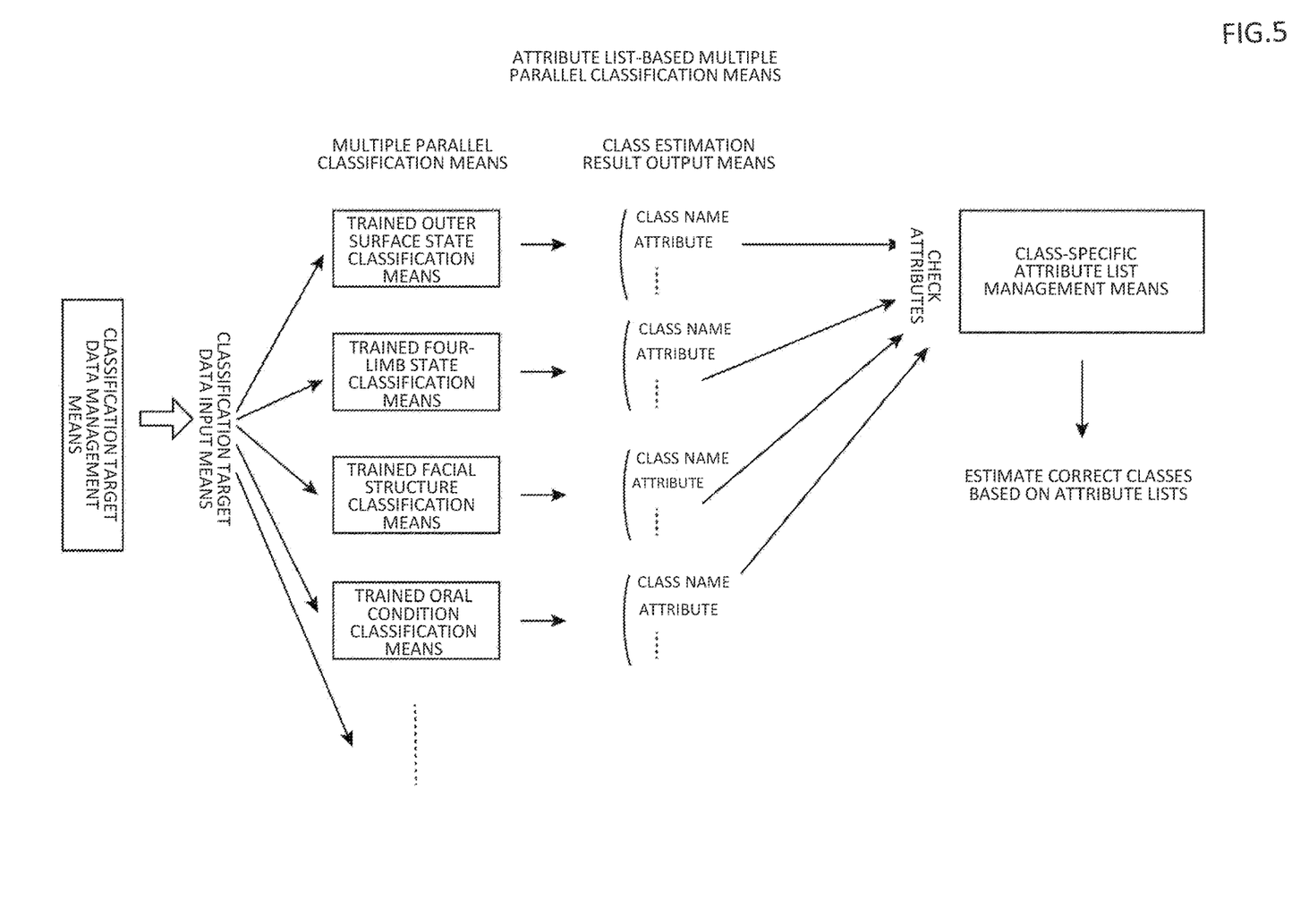
FIG. 5 is a drawing showing attribute list-based multiple parallel classification means.

FIG. 5 is a drawing showing attribute list-based multiple parallel classification means.

If multiple trained classification means are already present, classification data such as images or symptoms and/or findings from the classification target data management means is inputted to the multiple trained classification means in parallel, and class/attribute estimation lists are obtained from the respective trained classification means.

The obtained attribute lists are checked against attribute lists managed by the class-specific attribute list management means, and classes having a higher degree of matching are regarded as attribute list-based correct class estimation values. Conventionally, each time the classification target is changed, it is necessary to prepare a great number of training images or correct data sets and to train the classification means that requires a great amount of calculation. On the other hand, if a configuration as shown in FIG. 5 is used, the object can be accomplished also with respect to a new classification target by only re-using the trained classification means or adding minimum training to the classification means. While training of the classification means requires a great amount of calculation using several hundred thousand times of feedback, classification using the trained classification means is completed momentarily all at once. Thus, even if classification training data is inputted to many trained classification means in parallel as in FIG. 5, an increase in the amount of calculation is small.

While an embodiment of the present invention has been described above, the specific configuration of the present invention is not limited to the embodiment. Design changes and the like in the embodiment are included in the present invention without departing from the spirit and scope of the invention.

For example, image recognition is not limited to the images of the animals used as an example and can be applied to any images such as images of human faces or objects. While the present invention has been applied to the issue in the field of medicine as an example, it can be applied to an issue in any field, such as a determination as to whether there is a possibility that loan loss may occur or rises and falls in the stock price, as long as the issue relates to classification.

While deep learning, which is rapidly becoming widespread at the present time, has been taken as an example of the classification means, this example is not limiting. Even if an appropriate classifier, such as classification means using a neural network that is conventional or may emerge in future, various types of machine training, including support vector machine, or a classifier using a frequency distribution, is used in accordance with the situation, the present invention can be carried out as well.

The invention claimed is:

1. A classification system comprising a processor, wherein the processor:
obtains pieces of classification training data;
sets correct classes with respect to the pieces of classification training data;
receives the pieces of classification training data and outputs classification results;
trains the processor by comparing the classification results with the correct classes previously set and feeding back an error,
sets not only the correct classes of the pieces of classification training data but also correct attributes of the pieces of classification training data,
receives the pieces of classification training data; and
outputs not only the classification results but also class/attribute estimation results including attribute estimation results,
compares the class/attribute estimation results outputted from the processor with the correct classes and the correct attributes set and, if both are not matched, make an adjustment so that the class/attribute estimation results come close to the correct classes and the correct attributes by feeding back an error to the processor,
wherein
pieces of classification target data are newly inputted to the trained processor and
the processor outputs both classification results and attribute estimation results of the pieces of classification target data so that validity of the classification results can be considered,
wherein the processor:
manages attribute lists corresponding to the classes; and
estimates more likely classes of the inputted pieces of classification target data by applying the pieces of classification target data to the trained processor and checking obtained attribute lists against the attribute lists managed.

2. The classification system of claim 1, wherein the processor if the obtained attribute lists include an attribute that is not included in the attribute lists managed, makes an inquiry the attribute.

3. The classification system of claim 1, wherein
the trained processor comprises a plurality of trained processor disposed in parallel, and
the processor estimates correct classes of the pieces of classification target data by checking, against the managed attribute lists, attribute lists obtained by applying the pieces of classification target data to the plurality of trained processor disposed in parallel.

* * * * *